United States Patent [19]

Alexander et al.

[11] Patent Number: 5,070,436

[45] Date of Patent: Dec. 3, 1991

[54] SIGNAL VEST, COLORED, REFLECTIVE, AND LIGHTED, WORN BY PERSONS SEEN ON AND NEARBY ROADWAYS AND HIGHWAYS AND OTHER NEEDED AREAS

[76] Inventors: Richard M. Alexander, 12044 20th Ave. S., Seattle, Wash. 98168; Woodbury Abbey, III, 975 Turkey Rd., Olympia, Wash. 98502

[21] Appl. No.: 605,238

[22] Filed: Oct. 29, 1990

[51] Int. Cl.$^5$ .......................... F21L 15/06; G02B 5/12

[52] U.S. Cl. .................................... 362/108; 362/252; 362/191; 362/103; 340/321

[58] Field of Search ............... 362/108, 800, 252, 811, 362/191; 315/200 A, 201, 312; 340/321, 331, 332

[56] References Cited

U.S. PATENT DOCUMENTS

| | | | |
|---|---|---|---|
| 2,378,075 | 6/1945 | Frecska | 340/321 |
| 3,153,745 | 10/1964 | Gurian et al. | 340/321 |
| 3,686,583 | 8/1972 | Kawai et al. | 315/200 A |
| 4,328,533 | 5/1982 | Pardes | 362/108 |
| 4,432,041 | 2/1984 | Pfisterer et al. | 340/321 |
| 4,924,362 | 5/1990 | Janko et al. | 362/252 |

FOREIGN PATENT DOCUMENTS

| | | | |
|---|---|---|---|
| 1144938 | 3/1969 | United Kingdom | 362/108 |
| 2081069 | 2/1982 | United Kingdom | 362/108 |

*Primary Examiner*—Ira S. Lazarus
*Assistant Examiner*—Y. Quach
*Attorney, Agent, or Firm*—Roy E. Mattern, Jr.

[57] ABSTRACT

To protect people who must be seen, to avoid their injury, when they are in areas where safety protection is needed, such as on or nearby roadways, highways, waterways, airports, etc., a signal vest is worn by them, which is made of durable bright colored materials, durable reflective materials, and equipped in front and back with flashing lights, controlled by self contained electrical circuits, including a replacable and/or rechargeable battery. The electrical circuits operate independently of one another, so any damage to one circuit, only eliminates some of the front and back flashing lights.

8 Claims, 2 Drawing Sheets

FIG.3
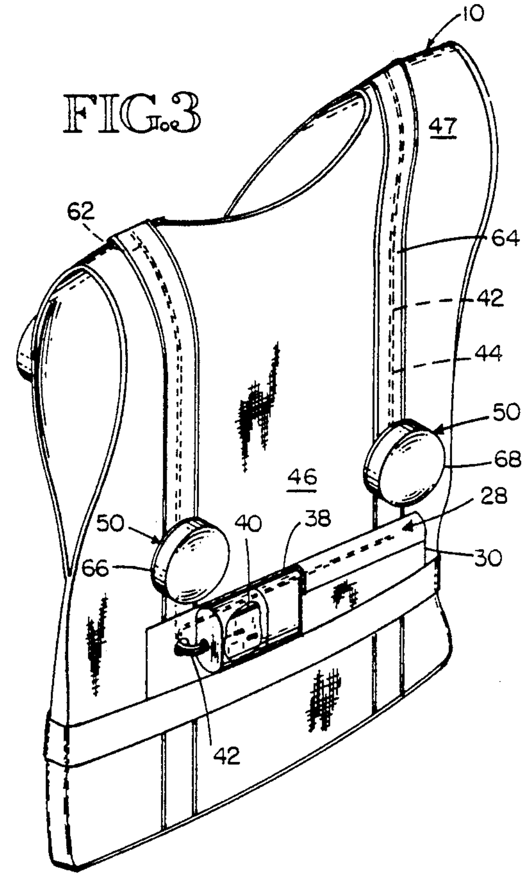
FIG.4
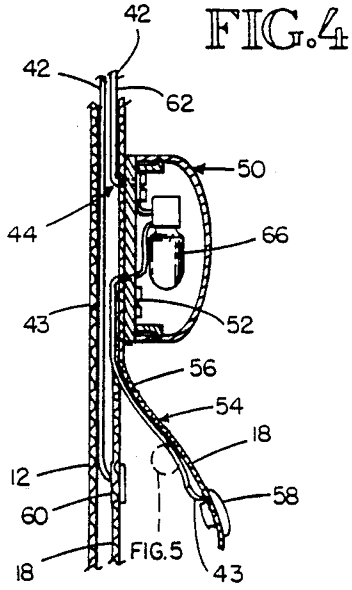
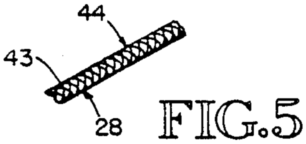
FIG.5
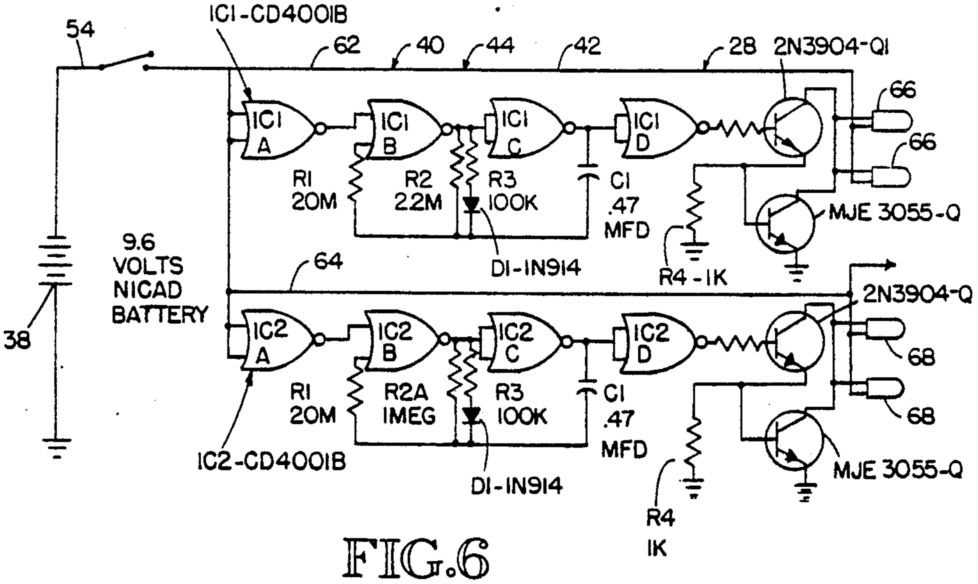
FIG.6

SIGNAL VEST, COLORED, REFLECTIVE, AND LIGHTED, WORN BY PERSONS SEEN ON AND NEARBY ROADWAYS AND HIGHWAYS AND OTHER NEEDED AREAS

BACKGROUND

There have been and are many items of equipment and clothing to be used and/or to be worn by persons, who undertake activities on or nearby roads and highways, so they will be seen by motorists and not accidentally injured or killed. Today many of these persons who are working on or nearby roads and highways wear vests made of bright yellow or orange colored materials, which are readily seen in the daylight. In addition, many of these vests are also made with reflective portions of materials, which are observed by motorists during twilight, nighttime, and overcast daytime, when vehicle headlights are turned on. Although these vests serve their purpose very well, there are times of reduced visibility when a greater margin of safety is needed.

SUMMARY

Although vests worn by persons undertaking activities on or nearby roadways and highways, have brightly colored materials and reflective materials, so motorists may timely observe them to avoid their injury, there are times of reduced visibility, when a greater margin of safety is needed. Therefore this signal vest is provided with colored and reflective materials and also flashable colored lights, providing a greater margin of safety, especially during times of reduced visibility.

This signal vest is made of preferably a very durable bright orange colored material having spaced vertical strips of reflective silver colored materials sewn on to the orange colored materials. Flashable yellow light units are secured, front and back, preferably by fasteners extending through both the reflective and colored materials. Circuit wires are positioned, where needed, in the vertical spaces provided between stitches used in sewing the reflective materials on to the colored materials.

In a central outside back location of this signal vest a pocket is provided to receive a battery and a subassembly of additional circuitry, including a printed circuit board. Throughout the entire circuitry, the circuit wires and printed circuits are arranged in preferably two separate circuits. If there is a failure in one of these circuits, only one half of the flashable yellow light units will fail to provide the flashing yellow lights.

The circuits are arranged on the respective left and right sides of the signal vest. Therefore, if there is a failure of only one circuit, there still will be front and back flashing yellow lights on at least one side of both the front and back portions of this signal vest.

An electrical switch is preferably provided which requires a very specific finger manipulation to secure it in the on position. Thereby, when the switch is intentionally opened, then subsequently the switch should not be inadvertently closed, for example, when the signal vest is hung up or laid away.

DRAWINGS

This signal vest is illustrated in the drawings, wherein:

FIG. 3 is a rear perspective view of the signal vest, with portions removed, to illustrate the location of circuitry and the battery;

FIG. 4 is a partial sectional view, taken along line 4—4 of FIG. 1, to illustrate the mounting of an amber light assembly on the signal vest, and also the arrangement of the pivotal tab with an electrical contact, before this tab is repositioned in making contact with a mating electrical contact on the surface of this signal vest;

FIG. 5 is a partial perspective view of the braided wire that is used in the pivotal tab, and extended above on the signal vest up to the amber light assembly, as shown in FIG. 4; and FIG. 6 is a schematic view of the circuitry and the battery.

DESCRIPTION OF THE PREFERRED EMBODIMENT

Figure 1:
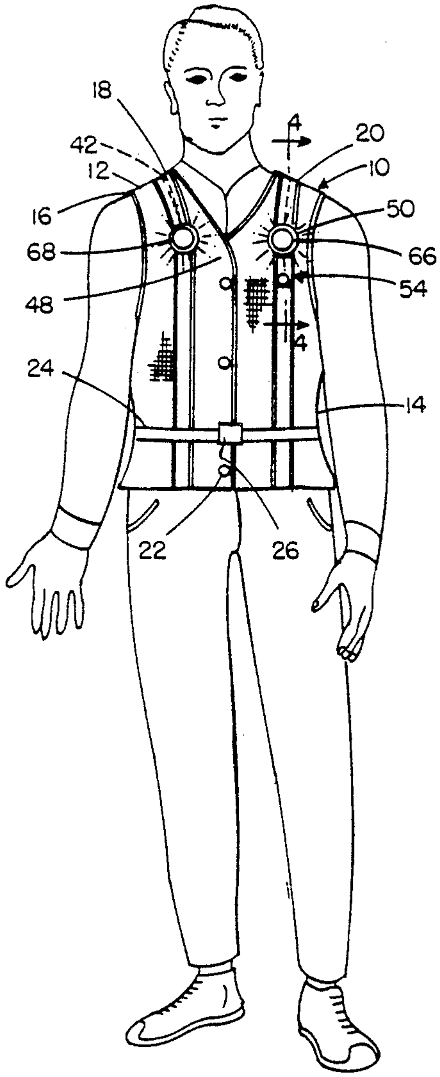
FIG. 1 is a front view of a person wearing the signal vest.
Figure 2:
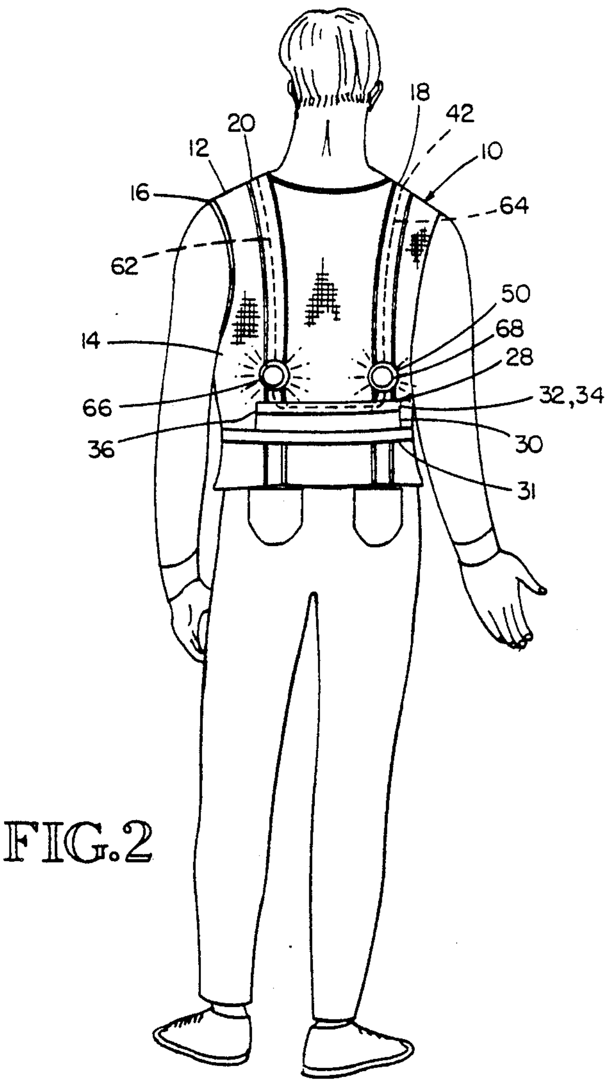
FIG. 2 is a back view of a person wearing the signal vest.

A preferred embodiment of the signal vest 10 is illustrated in the drawings. In FIGS. 1 and 2, this signal vest 10 is shown being worn by a person, so he or she will be readily observed by a motorist of an oncoming vehicle, not shown.

A bright colored material 12, such as an orange colored nylon, is shaped and sewn as a vest garment 14. The bright colored material edges are sewn within a folded over strip of very strong heavier material 16, which is often a black colored material.

Reflective bands of material 18, one band 18 located to the left, and another band 18 located to the right, of both the front and back of the vest garment 14 are sewn to the bright colored material 12, as illustrated in FIGS. 1, 2, and 3. The reflective bands of material 18 have their respective edges pre-sewn within a folded over strip of very strong material 20. Preferably, the reflective band material 18 is silver in appearance and the strong strip material 20 is often a black colored material.

Preferably, snap closure fasteners 22 and a belt 24 and buckle 26, are used by the person in putting on his or her vest garment 14. This vest garment 14, without more additions, is used very well to signal motorists of oncoming vehicles. However, there are many times when the weather conditions make the viewing by a motorist less effective, such as fog and heavy rain conditions, both during daylight, twilight, and nighttime.

Therefore, during the manufacture of the vest garment 14, an electrical assembly 28 is added to make the vest garment 14 a signal vest 10. A pocket 30 is provided at the lower back portion 31 of the vest garment 14 by using the same material 12, with the addition of hook and loop fastener materials 32, 34 to keep a pocket cover 36 in place.

Inside the pocket 30, a battery 38 is placed along with a printed circuit board subassembly 40, and extending portions of electrical circuit wires 42. During the manufacture of the vest garment 14, before the reflective bands of material 18 are sewn in place, continuing portions of circuit wires 42 of the overall electrical circuit 44 are positioned on the material 12, where eventually, the reflective bands of material 18 are to be sewn in place. Some of these circuit wires 42 are extended up the back of the vest garment 14, just above the pocket 30, to mid-back 46 locations. Other of these circuit wires 42 are extended completely up the back and over the shoulder portions 47, and then down to high-chest locations 48 on the front of the vest garment 14.

At these mid-back locations 46 and high-chest locations 48, amber light subassemblies 50, following their respective connections to the circuit wires 42, are secured in place to the vest material 12 and the reflective band material 18, using a fastener subassembly 52.

Preferably, just below one of the amber light subassemblies 50, a switch subassembly 54 is positioned. As illustrated in FIGS. 1 and 4 a pivotal tab 56 of reflective band material 18, holds one electrical contact 58, and the reflective band material 18 on the vest garment 14, below this pivotal tab 56, positions the other electrical contact 60, of this switch subassembly 54.

These electrical contacts 58 and 60 are metal garment fasteners, having respective male and female formed snap components. When these electrical contacts 58 and 60 are closed, then the pivotal tab 56 is partially looped.

When the pivotal tab 56 lays flat against the reflective band material 18 the electrical contact 58 thereof is well spaced from the electrical contact 60 on the reflecting band material 18. This positioning avoids unwanted matching of these contacts, when the signal vest 10 is laid down or hung up, or being worn, and the lights are not needed. The circuit wires 42 in approaching the pivotal tab 56 and in this tab are woven circuit wires 43 as illustrated in FIGS. 4 and 5.

The overall electrical circuit 44 is schematically illustrated in FIG. 6. Although only one battery 38 and one switch subassembly 54 are used, as illustrated, the remainder of this circuitry 44 is arranged in duplicate sub-circuits 62, 64.

Each sub-circuit 62 or 64 serves either the left or the right side portions of both and front and back of the vest garment 14. Therefore, if the vest garment 14 were to be torn or otherwise damaged, causing a respective sub-circuit 62 or 64 to fail, the other sub-circuit 62 or 64 would continue on intact, continuing to make the vest garment 14 a signal vest 10 with flashing yellow lights. Preferably the flashing yellow lights 66 on one side of the signal vest 10 flash at one instance of time, and subsequently the flashing yellow lights 68 on the other side of the signal vest 10 flash at a slightly later instance of time.

In specific reference to the circuitry and components illustrated in FIG. 6, when the switch subassembly 54 is closed, the battery energy is applied respectively to the sub-closed, circuits 62, 64 and soon the yellow lights 66, 68 are flashing. In each alike respective sub-circuit 62 or 64, there are four IC gates connected in series. The first IC gate, designated ICI-A, acts as a buffer and switch. This first gate is used as a trigger for the ICI-B and ICI-C gates. These gates ICI-B and ICI-C, together with resistors R1, R2, R3, capacitor C1, and then with the gate ICI-D, comprise a cmos a stable multivibrator or oscillator. This flashing rate obtained by this oscillator is determined by the selection of the capacitor C1, the resistors R2 and R3, and the diode D1. The selection of the resistor R1 determines the overall circuit stability. These components are selectively arranged to deliver an oscillator with an asymmetrical pulse, i.e. one whose "off" time is much longer than its "on" time. In this flashing light circuitry the "on" time is approximately 40 milliseconds and the "off" time is approximately 1½ seconds. The two different resistors R2, R2A, are selected to deliver different "off" times to avoid sympathetic oscillation of the on-times of the lights. In this way there are two sets of two each flashing lights, which are flashing at independent rates, for better effective observation, and conservation of the electrical battery energy.

The oscillation, or the turning on and off of a positive voltage current at the input of the gate ICD, is thereafter inverted by gate ICD, to then trigger the respective transistors 2N 3904 and MJE 3055. These transistors are connected, as a darington pair, to act as switches to apply electrical power to two amber light subassemblies 50, which, when flashing, create the extended safety visibility of the person wearing this signal vest 10. These transistors are biased into their operating range by resistor R4.

Preferably the lights 66, 68, are 6.3 volts, 250 MA, lamps. The battery is preferably a 9.6 volt battery, capable of being charged for one hour to provide operations for thirty hours. These lights and batteries are available over the counter, when their replacements are necessary.

This overall electrical circuit 44 is designed to save battery energy. This circuit 44 provides electrical energy at 9.6 volts in a very brief pulse to the 6.3 volt lamps to briefly complete the heating of their respective filaments and then the pulse is terminated. By this brief on and off energy pulse the lamps flash very effectively, at a brighter intensity, yet their operating life remains essentially normal. This brief use of electrical energy prolongs the battery life.

Moreover, when the lighting pulse is occurring there is an electro-magnetic field build up. Then when the lighting pulse is terminated, this electro-magnetic field reverses creating a reactive energy pulse, which also prolongs battery life.

The garment vest 14 suitable for clear daylight operations, when equipped with the electrical assembly 28, with the flashing yellow lights 66, 68, becomes a signal vest 10 to further protect the person wearing it during troublesome weather conditions and during night operations. These signal vests 10 will be worn by road construction workers, surveyors, policemen, firemen, school patrol persons, tow truck drivers, bicyclists, joggers, pedestrians, and other persons who want to be seen at night and during bad weather conditions, which are decreasing or eliminating the visibility of the person, in the eyes of a motorist of an oncoming vehicle. The wearer of the signal vest 10 will be seen soon enough by a motorist so he or she will not be injured or killed by an oncoming vehicle.

These signal vests are to be used wherever safety protection is needed. In addition to roadway and highway locations, there are waterway and airport locations, etc.

We claim:

1. A signal vest, colored, reflective, and lighted with flashing lights, to be worn by persons to be seen on and nearby roadways and highways, comprising:

a) a vest garment made of colorful and reflective materials; and b) an electrical assembly comprising in turn:

i) a battery supported by the vest garment;

ii) multiple light subassemblies supported by the vest garment and arranged to locate two of them spaced apart on the back of the vest garment respectively on either side of the centerline of a vest garment, and to locate two of them spaced apart on the front of the vest garment, respectively on either side of a centerline of the vest garment;

iii) a switch supported by the vest garment; and iv) an overall electrical circuit supported by the vest garment, to intermittently supply the electrical energy, derived from the battery, to the respective multiple light subassemblies, when the switch is closed, to create flashing lights to be seen by a motorist of an oncoming vehicle, and arranged in two sub-circuits, with one sub-circuit intermittently supplying electrical energy, derived from the battery, to the multiple light subassemblies arranged on one side of the centerline of the vest garment both the front and back thereof, and with the other sub-circuit intermittently supplying electrical energy, derived from the battery, to the multiple light subassemblies arranged on the other side of the centerline of the vest garment, both the front and back thereof;

wherein each sub-circuit, in turn comprises:

a′) a cmos a stable oscillator, in turn comprising;

(i′) four IC gates connected in series;

(ii′) three resistors connected to and between some of the IC gates;

(iii′) a diode; and (iv′) a capacitor connected to and between two IC gates;

b′) a darington pair of transistors, comprising in turn:

(i′) two transistors;

(ii′) Two resistors and the said two transistors, arranged together to form the said darington pair which are connected between the last IC gate and light subassemblies to function as switches; and c′) the light subassemblies connected to the darington pair of transistors.

2. A signal vest, as claimed in claim 1, wherein the switch supported by the vest garment comprises an electrical contact positioned directly on the vest garment, and another electrical contact positioned on a pivotal tab, which is sewn to the vest garment, whereby, when the electrical contacts are not engaged, the pivotal tab has a length, when arranged next to the vest garment, positions the electrical contact thereon spaced well away from the electrical contact positioned directly on the vest garment, thereby avoiding an inadvertent unwanted closing of these electrical contacts.

3. A signal vest, as claimed in claim 2, wherein the overall electrical circuit has woven circuit wires secured to the pivotal tab, and connected between the electrical contact, which is positioned on this pivotal tab, and other portions of the overall electrical circuit.

4. A signal vest, colored, reflective, and lighted with flashing lights, to be worn by persons to be seen on and nearby roadways and highways, comprising:

a) a vest garment made of colorful and reflective materials; and b) an electrical assembly comprising in turn:

i) a battery supported by the vest garment;

ii) multiple light subassemblies supported by the vest garment;

iii) a switch supported by the vest garment comprising in turn, an electrical contact positioned directly on the vest garment, and another electrical contact positioned on a pivotal tab, which is sewn to the vest garment, whereby when the two electrical contacts are not engaged, the pivotal tab has a length, when arranged next to the vest garment, positions the electrical contact thereon, spaced well away from the electrical contact positioned directly on the vest garment, thereby avoiding an inadvertent unwanted closing of these electrical contacts; and iv) an overall electrical circuit supported by the vest garment, to intermittently supply the electrical energy, derived from the battery, to the respective multiple light subassemblies, when the switch is closed, to create flashing lights to be seen by a motorist of an oncoming vehicle.

5. A signal vest, as claimed in claim 4, wherein the overall electrical circuit has woven circuit wires secured to the pivotal tab, and connected between the electrical contact, which is positioned on this pivotal tab, and other portions of the overall electrical circuit.

6. A signal vest, as claimed in claim 5, wherein the multiple light subassemblies are arranged to locate two of them spaced apart on the back of the vest garment respectively on either side of the centerline of a vest garment, and to locate two of them spaced apart on the front of the vest garment, respectively on either side of a centerline of the vest garment, and the overall electrical circuit is arranged in two sub-circuits, with one sub-circuit intermittently supplying electrical energy, derived from the battery, to the multiple light subassemblies arranged on one side of the centerline of the vest garment both the front and back thereof, and with the other sub-circuit intermittently supplying electrical energy, derived from the battery, to the multiple light subassemblies arranged on the other side of the centerline of the vest garment, both the front and back thereof.

7. A signal vest, as claimed in claim 6, wherein the intermittent supplying of electrical energy by the two sub-circuits is respectively differently timed to increase the visual frequency of the on and off phases of the light subassemblies.

8. A signal vest, as claimed in claim 7, wherein the vest garment has a pocket to receive the battery and portions of the electrical assembly.

* * * * *